UNITED STATES PATENT OFFICE.

GUADALUPE LÓPEZ DE LARA, OF GUADALAJARA, MEXICO.

FOOD PRODUCT AND METHOD OF MAKING THE SAME.

1,268,860.　　　　Specification of Letters Patent.　　Patented June 11, 1918.

No Drawing.　　Application filed October 30, 1917.　Serial No. 199,266.

*To all whom it may concern:*

Be it known that I, GUADALUPE LÓPEZ DE LARA, a citizen of the Republic of Mexico, residing in Guadalajara, Jalisco, Mexico, have invented certain new and useful Improvements in Food Product and Methods of Making the Same, of which the following is a specification.

This invention relates to the production of an improved article of food from Indian corn.

For the preparation of Mexican tortillas the clean corn is commonly placed in an earthen pot with a weak milk of lime and is boiled for a short time and then allowed to cool. The corn thus treated, called nixtamal, is washed and is then ground while wet with the addition of sufficient water to form a paste from which the tortillas are made.

The object of this invention is to produce a corn meal having the same general characteristics as nixtamal and adapted for use for the same general purpose, but capable of being kept in prepared form ready for use at any time and of a generally more uniform and improved quality.

In accordance with the invention, the corn, having been cleaned, washed and scoured in the usual way, is subjected to a coarse grinding or reducing action by which the hulls are loosened from the bodies of the grains and the grains are cracked. By a winnowing process the separation of the hulls from the cracked bodies of the grains is effected, as is commonly done in the treatment of various cereals. The mode of treatment of the corn, as thus far referred to, is common and well understood and it is at this stage of the treatment that the present invention is put into effect.

The hulls are first predigested or glutinized by treatment for a suitable period of time, usually about twenty-four hours, with a weak solution of calcium hydrate, either cold or hot. Thereafter the free liquid is drawn off, the hulls being stirred so as to facilitate the removal of the lime as much as possible. Thereafter the hulls are dried, preferably at a temperature of about 212° F., so as to drive off the water and promote the glutinizing, and the dry hulls are ground to a fine powder which, in the completed food product, acts as a binder meal.

The bodies of the grains, without the hulls, are ground separately, to the desired degree of fineness, forming what may be called a prima meal.

Finally the prima meal and the binder meal are mixed together with a small quantity of bi-carbonate of soda, which is added for the purpose of neutralizing, that is, of changing into a carbonate of lime or of carbonating whatever free lime may remain in the binder meal.

The calcium hydrate, with the addition of water and heat, converts the hulls into a glutinous mass, which is more or less predigested and furnishes the binder for the prima meal which is desirable for the formation of a dough or paste of suitable consistency for the making of tortillas. Although it is preferable to employ the calcium hydrate in the manner already described, it is obvious that it might be added as a dry powder to the finely ground, dry hulls, without previous soaking in the weak solution of calcium hydrate, the addition of water to form the paste and the application of heat in cooking bringing about the desirable glutinizing of the hulls.

The quantity of calcium hydrate to be employed, either in the wet process or in the dry process, may vary somewhat according to the nature of the corn, being usually from 5 parts of calcium hydrate to 10,000 parts of hulls, by weight, to 50 parts of calcium hydrate to 10,000 parts of hulls. The quantity of bi-carbonate of soda to be added will depend upon the quantity of calcium hydrate used, the bi-carbonate of soda being used in such quantity as is sufficent to carbonate the calcium hydrate.

The hull of the corn usually represents from 8% to 10% of the body of the corn, while the prepared meal, when the hulls have been treated in the manner described, usually contains from 3% to 5% by weight of the binder meal.

The main purpose of the invention being to bring about glutinizing of the hulls of the corn and such glutinizing being effected by the calcium hydrate with water and heat, it is obvious that the precise mode of treatment may be varied without departure from the spirit of the invention. Thus, as already explained, the calcium hydrate might be ground with the dry hulls, or the binder meal, having been prepared as already described, might be added to the cracked corn during the grinding thereof; or the hulls, treated with the calcium hydrate and dried, may be ground together with the cracked corn.

I claim as my invention:

1. The method of preparing Indian corn for food which consists in separating the hulls from the bodies of the grains, glutinizing the hulls and grinding and mixing the hulls with the bodies of the grains.

2. The method of preparing Indian corn for food which consists in treating the hulls of the corn with calcium hydrate and grinding and mixing the hulls and the bodies of the grains.

3. The method of preparing Indian corn for food which consists in treating the hulls of the corn with calcium hydrate, grinding and mixing the hulls and the bodies of the grains, and carbonating the calcium hydrate.

4. The method of preparing Indian corn for food which consists in treating the hulls of the corn with calcium hydrate, grinding and mixing the hulls and the bodies of the grains, and adding bi-carbonate of soda to carbonate the calcium hydrate.

5. The method of preparing Indian corn for food which consists in separating the hulls from the bodies of the grains, subjecting the hulls to the action of a weak solution of calcium hydrate, drying the hulls and grinding and mixing the hulls and the bodies of the grains.

6. The method of preparing Indian corn for food which consists in separating the hulls from the bodies of the grains, subjecting the hulls to the action of a weak solution of calcium hydrate, drying the hulls, grinding and mixing the hulls and the bodies of the grains and adding bi-carbonate of soda.

7. The improved food product which consists of a ground mixture of the bodies of the grains of corn and the glutinized hulls.

This specification signed this 20th day of October, A. D., 1917.

GUADALUPE LÓPEZ DE LARA.